(12) United States Patent
Bean

(10) Patent No.: US 7,462,091 B1
(45) Date of Patent: Dec. 9, 2008

(54) APPARATUS WITH BELLOWS FOR CALLING GAME

(75) Inventor: Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 409 days.

(21) Appl. No.: 10/709,975

(22) Filed: Jun. 10, 2004

Related U.S. Application Data

(60) Continuation of application No. 10/605,051, filed on Sep. 4, 2003, now Pat. No. 6,752,681, which is a continuation of application No. 09/962,560, filed on Sep. 25, 2001, now Pat. No. 6,648,716, and a division of application No. 09/326,961, filed on Jun. 7, 1999, now Pat. No. 6,328,623.

(51) Int. Cl.
*A63H 5/00* (2006.01)

(52) U.S. Cl. ............... 446/208; 446/397; 446/193

(58) Field of Classification Search ......... 446/207–209, 446/397, 193, 418
See application file for complete search history.

(56) References Cited

U.S. PATENT DOCUMENTS

| | | | | |
|---|---|---|---|---|
| 2,583,400 | A | 1/1952 | Wade | 446/188 |
| 2,608,796 | A * | 9/1952 | Bicocchi | 446/208 |
| 3,172,223 | A | 3/1965 | Stager | 43/2 |
| 4,576,584 | A | 3/1986 | Hill | |
| 4,940,451 | A | 7/1990 | Leady | 446/208 |
| 4,941,369 | A | 7/1990 | Specht et al. | |
| 5,549,498 | A | 8/1996 | Kirby | 446/193 |
| 5,577,946 | A | 11/1996 | Oathout | 446/208 |
| 5,613,891 | A | 3/1997 | Lamo | 446/193 |
| 5,704,154 | A | 1/1998 | Galfidi, Jr. | 446/193 |
| 5,803,785 | A * | 9/1998 | Primos et al. | 446/207 |
| 5,885,126 | A | 3/1999 | Carlson | 446/208 |
| 6,042,447 | A | 3/2000 | Thompson | 446/193 |
| 6,106,357 | A | 8/2000 | Weiser | 446/208 |
| 6,240,671 | B1 * | 6/2001 | Galfidi, Jr. | 42/90 |
| 6,547,627 | B1 | 4/2003 | Oathout | 446/208 |
| 6,575,804 | B1 * | 6/2003 | Primos | 446/202 |

\* cited by examiner

*Primary Examiner*—Gene Kim
*Assistant Examiner*—Urszula M Cegielnik
(74) *Attorney, Agent, or Firm*—Simmons Perrine PLC

(57) ABSTRACT

A game call having a bellows coupled to a reed for producing sound, together with a reed controller which is operable by contact with the bellows, thereby changing the pitch of the sound produced.

15 Claims, 2 Drawing Sheets

US 7,462,091 B1

APPARATUS WITH BELLOWS FOR CALLING GAME

CROSS REFERENCE TO RELATED APPLICATIONS

This application is a continuation of application Ser. No. 10/605,051 entitled "APPARATUS WITH BELLOWS FOR CALLING GAME" which was filed on Sep. 4, 2003, which is a continuation of application Ser. No. 09/962,560 filed on Sep. 25, 2001, and issued as U.S. Pat. No. 6,648,716 which itself was a Divisional of application Ser. No. 09/326,961 filed Jun. 7, 1999, and issued Dec. 11, 2001 as U.S. Pat. No. 6,328,623, which patent has now been disclaimed. These applications and patents are all incorporated herein in their entirety by this reference.

BACKGROUND OF INVENTION

In the past, hunters have used various devices to call game, such as the ubiquitous tube call, in which air is blown through a mouthpiece and over a reed to generate sound. Other calls have used a flexible bellows or bulb attached to a tube call to eliminate the need for blowing through the mouthpiece.

While these calls have many advantages, they also have significant drawbacks.

First of all, the skill required to successfully operate the tube call is often more than is possessed by inexperienced or infrequent hunters and game callers.

Secondly, moisture from the operator's breath often condenses within the tube call, which may adversely affect the sound produced by the call.

Thirdly, the calls using bellows and bulbs have often had limited operational characteristics, owing to the lessened control that a bellows often has in comparison to a mouth-blown call.

Consequently, there exists a need for improvement in game calling methods and apparatuses.

SUMMARY OF INVENTION

It is an object of the present invention to provide an easily operated game call having pitch variation capabilities.

It is a feature of the present invention to include a reed plunger for controlling pitch.

It is an advantage of the present invention to allow for manipulation of the reed plunger in an easy to use fashion.

It is another advantage of the present invention to increase the certainty that the call will produce an appropriate sound.

It is yet another advantage of the present invention to provide for tuning of the call while in the field without the need for completely dismantling the call.

The present invention is an apparatus and method for calling game which is designed to satisfy the aforementioned needs, provide the previously stated objects, include the above-listed features and achieve the already articulated advantages. The present invention is carried out in an "errorless multi-pitch" approach in a sense that the amount of errant sounds, which often are produced by multi-pitch calls, is dramatically reduced.

Accordingly, the present invention is an apparatus and method for calling game which includes a bellows and a manually operative reed plunger disposed within an air chamber coupled to the bellows, where the reed plunger provides for variation of sound produced by permitting variably controllable reed vibration states.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
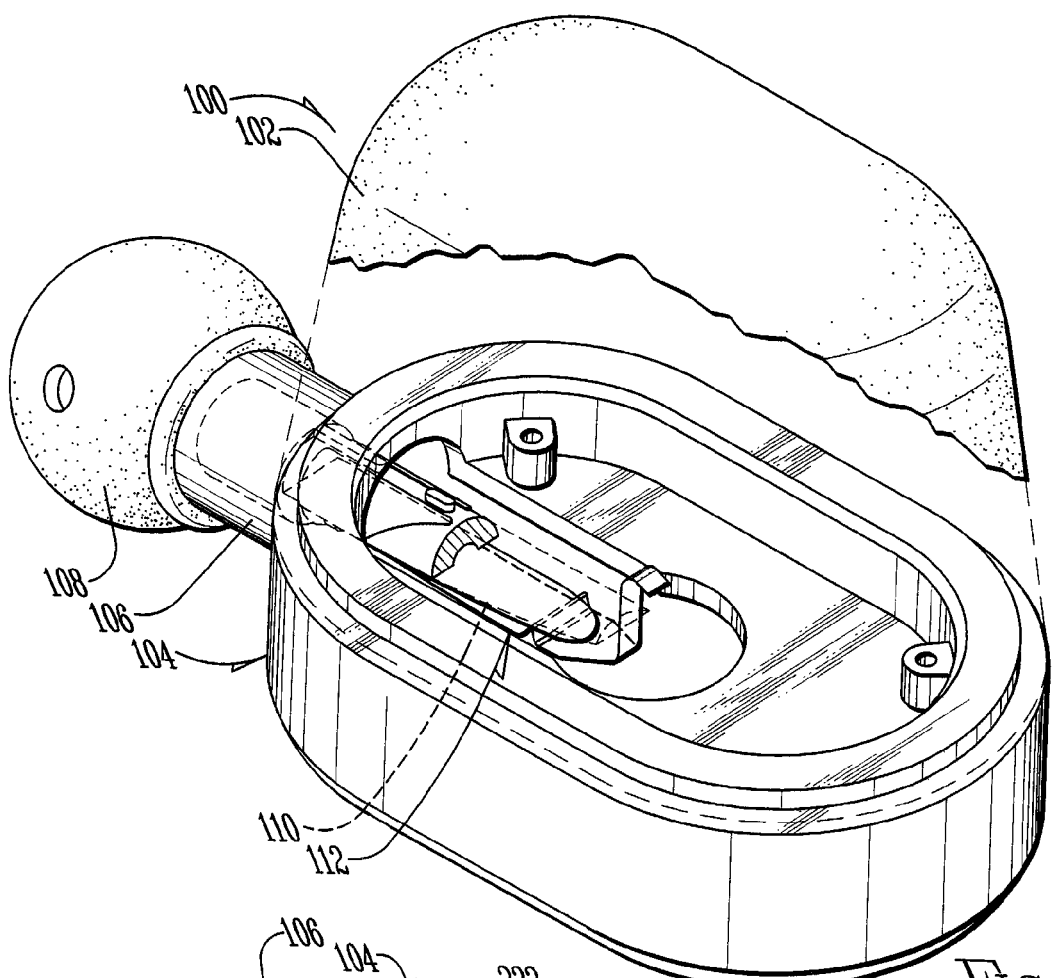
FIG. 1 is a cutaway perspective view of the call of the prior art, where the cutaway portion reveals operable portions of the call.

Now referring to the drawings, wherein like numerals refer to like matter throughout, and more particularly to FIG. 1, there is shown an apparatus of the prior art, generally designated 100, which includes a bellows 102 which may be any flexible cap or cover which is easily depressed but sufficiently resilient to return to an earlier shape when pressure is no longer being applied. Also shown is a call central section 104, which is a container capable of receiving bellows 102 and an optional throat section 106. Call central section 104 is shown having a cutaway section 110, which reveals a reed/pitch control assembly 112, therein. An optional sound chamber 108 is also shown. Optional throat section 106 may be made of the same material as call central section 104, which could be any suitable material with sufficient rigidity and strength to accomplish the function of receiving bellows 102 and retaining reed/pitch control assembly 112. Material such as plastic, composite materials, wood or metal and others all could be used. Optional sound chamber 108 can be of any suitable material, but a flexible and pliable material, such as rubber or soft plastic, similar to material used for the bellows 102, may be preferred.

Figure 2:
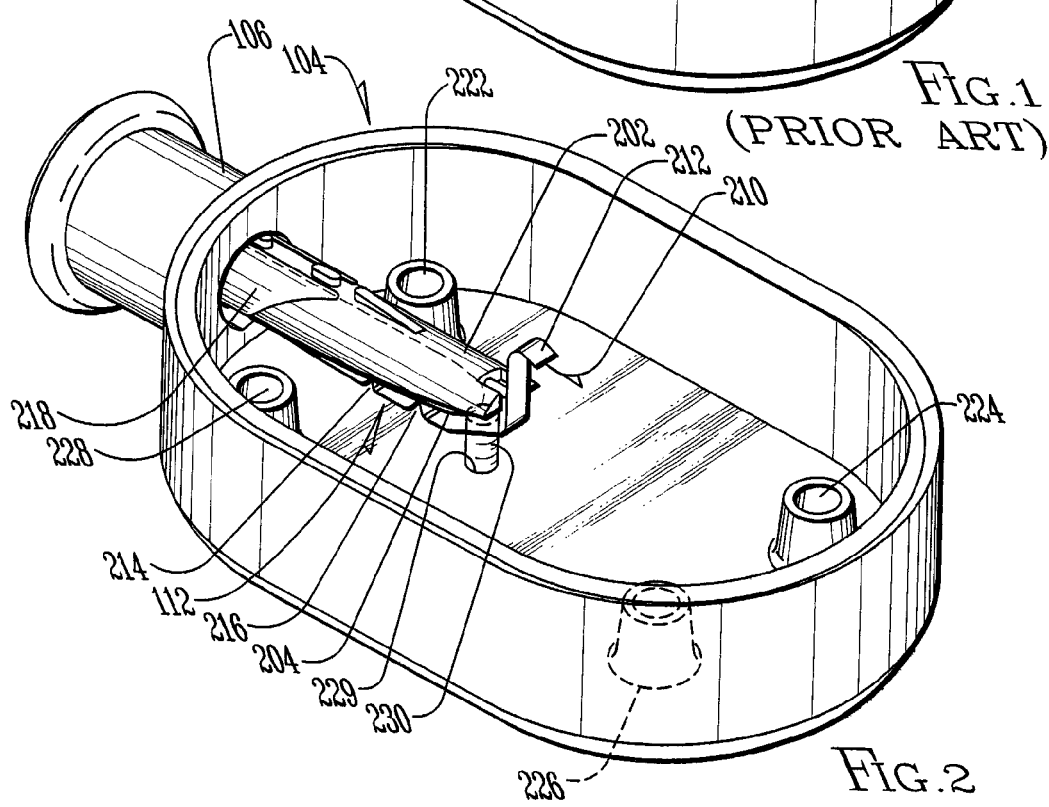
FIG. 2 is a perspective view of a central portion of the call of the present invention.

Now referring to FIG. 2, there is shown a detailed view of portions of the present invention, including call central section 104 after bellows 102 has been removed. Shown disposed inside of call central section 104 is reed/pitch control assembly 112, which includes an air tube 202 and a reed 204. Air tube 202 provides a passage for air to pass therethrough and further provides structural support for reed/pitch control assembly 112. Reed 204 is a thin planar member which vibrates, producing sound when air passes over it. The combination of air tubes and reeds is a well-known means to provide sound in game calls. A reed plunger 210 is also shown having a top contact end 212 for cooperation with and activation by bellows 102 when bellows 102 is fully or near fully depressed. Reed plunger 210 may be a single piece of thin metal, such as copper or brass or any other suitable material which has sufficient rigidity to transfer force from the bellows 102, to affect the vibration parameters of reed 204 by contacting reed 204 at various points thereon. Reed plunger 210 may have one or more reed contacting detents disposed thereon. First reed contacting detent 214 and second reed contacting detent 216 are shown. It should be understood that various numbers of detents may be used. It may be preferable that no detents, or only a single detent, be used if the call is designed as an elk call. However, if the call is designed as a turkey call or other type of call, then multiple detents may be preferred. Reed plunger 210 has an air tube coupling section 218 which couples to air tube 202.

Also shown in FIG. 2 is first screw sleeve 222, second screw sleeve 224, third screw sleeve 226, and fourth screw sleeve 228. A reed plunger limiter 230 is shown disposed through limiter hole 229. Reed plunger limiter 230 may be a screw or other member which is adjustable, so as to limit the permissible deflection of reed plunger 210 to predetermined levels. These predetermined levels are set to prohibit unwanted pitches from being emitted by the call if the bellows 102 and reed plunger 210 are depressed further than is needed to produce the desired pitch. Reed plunger limiter 230 may be a set screw which is adjustable through limiter hole 229.

Figure 3:
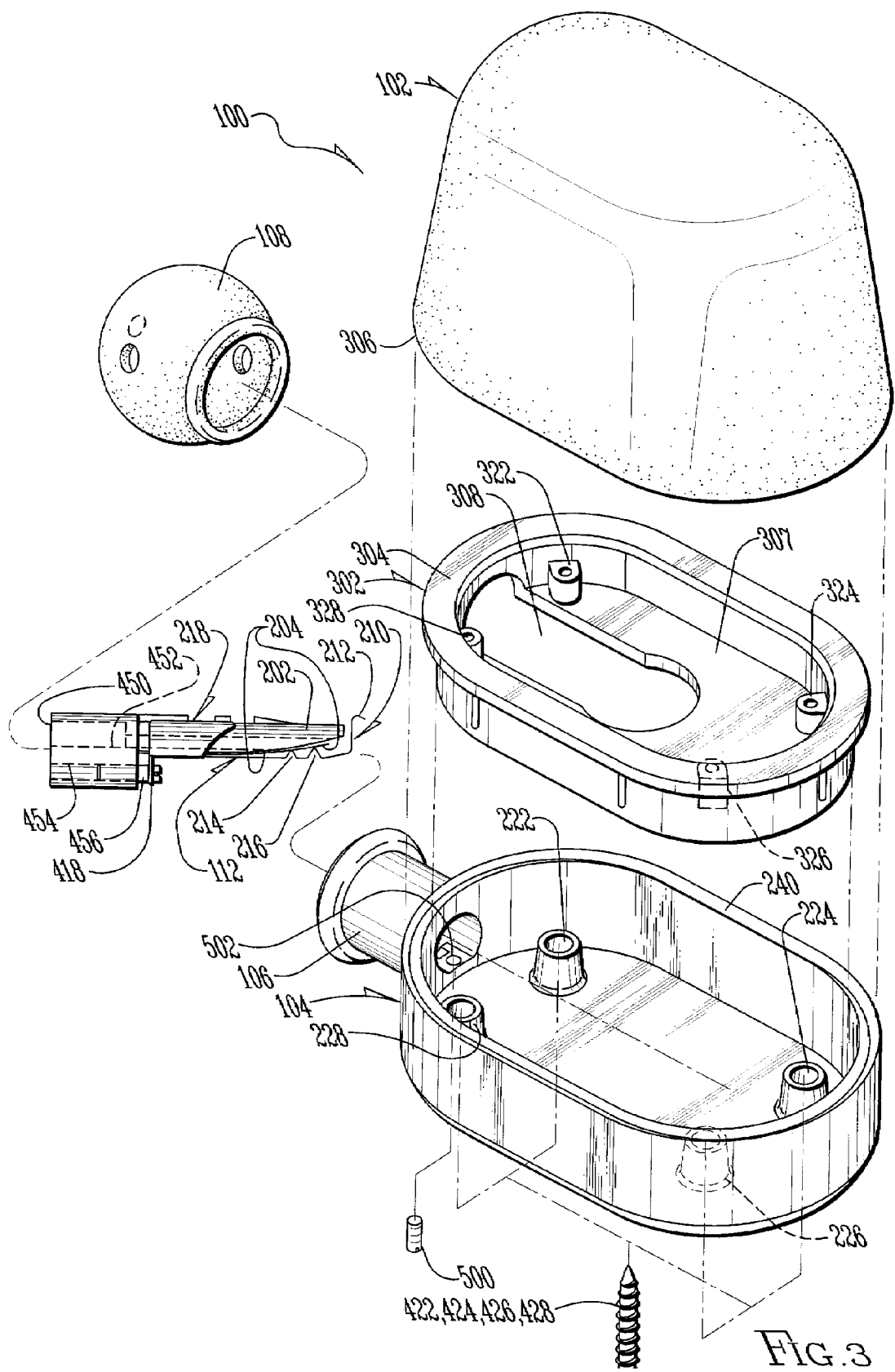
FIG. 3 is a perspective partial exploded view of a call of the present invention where the dotted lines show the orientation of objects when in an assembled state.

Now referring to FIG. 3, there is shown a partially exploded view of the call of the present invention which includes a bellows grasping member 302, which has a bellows grasping rim 304, which may be inserted inside bellows 102 and cooperate with a bellows bottom rim 306 formed around the periphery of bellows 102. Bellows grasping member 302 has an air passage hole 308 therein for permitting air from inside bellows 102 to flow to and through air tube 202. When the bellows grasping member 302 is pulled into contact with central body rim 240 by insertion of first, second, third and fourth screws 422, 424, 426 and 428, respectively into first, second, third, and fourth screw sleeves 222, 224, 226, and 228, respectively, and coupling with first, second, third, and fourth screw grasping members 322, 324, 326 and 328 respectively, preferably an air-tight seal forms between bellows 102 and call central section 104. Bellows grasping member 302 also assists in limiting the maximum stroke of the bellows 102 as it is compressed during call operation, and thereby assists in limiting the range of deflections of reed plunger 210 which are permissible. The placement of the bottom 307 of bellows grasping member 302 and its air passage hole 308 with the respect to the top of the bellows can be varied to alter the stroke characteristic of the bellows 102.

Also shown in FIG. 3 is a side view of reed/pitch control assembly 112, which shows a pitch adjustment screw-receiving flange 418 disposed on reed plunger 210. Reed plunger 210 is capable of translational motion along air tube 202 and reed 204. Translating reed plunger 210 results in different points of contact along reed 204 by detents 214 and 216 (or preferably a single detent for elk calls). This results in tuning the pitch of the call. The translation of the reed plunger 210 is accomplished by turning reed pitch adjusting screw 456, through pitch adjusting screw hole 454, so that reed pitch adjusting screw 456 cooperates and manipulates the pitch adjustment screw-receiving flange 418 of reed plunger 210. Air tube 202 has an outlet end 450 with an air outlet orifice 452 therein. Optional sound chamber 108, with its air holes therein, may be disposed over outlet end 450 of optional throat section 106. Note the throat section 106 is optional, as is the sound chamber 108, but in a preferred embodiment, both throat section 106 and sound chamber 108 may be particularly desirable. Also shown is a locking screw 500 disposed through a locking screw hole 502 in throat section 106. Locking screw 500 is for securing reed/pitch control assembly 112 into the central section when air pressure therein might otherwise cause reed/pitch control assembly 112 to be forced out of throat section 106.

In operation, the present invention accomplishes the goal of generating sounds suitable for calling game as follows: the bellows 102 is depressed a first distance, thereby creating an airflow over reed 204 and through air tube 202. This airflow causes a vibration of the reed 204. The pitch of the call is controlled by the point of contact of detent(s) with the reed 204. The point of contact is adjusted with reed pitch adjusting screw 456. The bellows 102 is further depressed, so as to engage top contact end 212 of reed plunger 210, which is caused to move, thereby flexing and causing detent 216 to no longer contact reed 204. This allows reed 204 to vibrate over a different length, thereby generating a different pitch as air passes over reed 204 and through air tube 202. If the motion of reed plunger 210 is not limited by limiter 230, then reed plunger 210 can be caused to further flex, thereby releasing detent 214 from contact with reed 204, thereby generating a sound having yet another pitch.

In operation, the call 100 can be tuned to provide various sounds for calling game. For example, if a predetermined elk sound is desired, then that sound is analyzed to understand the variations in pitch during the duration of the call. For example a call for an elk might start with a high pitched first segment and finish with a much lower pitch second segment. If screw 456 is adjusted, detent 216 can be positioned along reed 204 so that the first pitch segment emulates a first part of a well-known sound made by a cow elk and the second segment of the call is matched in frequency to a second segment of such well known sounds made by a cow elk. Additionally, if the pre-determined sound has a third segment with a third pitch, then the placement of detent 214 can be matched by screw 456 or during manufacture of reed plunger 210. It is believed that for elk, one of the detents 214 or 216 can be omitted or in the alternative, both can be included but through use of limiter 230 the reed plunger 210 can be prohibited from causing detent 214 from disengaging for the reed 204. Again, for example, an elk call may have a relatively strong and noticeable second lower-pitched second segment. This is accomplished by matching the desired duration of the second segment of the call to the position of the top contact end 212 within the bellows 102. These selections of a predetermined height of top contact end 212, height of limiter 230 and/or placement of detent(s) to produce a predetermined sound desirable for calling elk are important aspects of the method of the present invention. While particular configurations of the present invention may be well suited for elk calls, it is intended that particular other configurations of the call and uses of such other configurations for game other than elk are included within the scope of the present invention.

These well-known sounds made by a cow elk and elk fawns are referred to herein as natural elk calls. While each elk may have a unique call, they have common characteristics which are well known to hunters and designers of elk calls. The tuning in the field of the present invention and the optimization of the parameters of this call during design and manufacture are often done by careful listening to the sound produced by an individual familiar with these natural elk calls. While it is possible to use sophisticated electronic sound measuring equipment, it is believed that the present invention may be readily manufactured without such equipment, if an individual who is familiar with such natural elk calls assists in the process.

It is thought that the method and apparatus of the present invention will be understood from the foregoing description and that it will be apparent that various changes may be made in the form, construct steps and arrangement of the parts and steps thereof, without departing from the spirit and scope of the invention, or sacrificing all of their material advantages. The form herein described is merely a preferred exemplary embodiment thereof.

The invention claimed is:
1. A game call apparatus, comprising:
a housing;
a sounding board coupled to the housing, the sounding board defining a main air channel;
a reed coupled to the sounding board adjacent the main air channel to produce sounds when air passes through the main air channel;

a pressure point structure disposed in the housing, the pressure point structure engaging the reed at a reed contact location, the pressure point structure urging the reed toward the sounding board at the reed contact location, the pressure point structure being movable relative to the reed, as air is forced across the reed to change a free end length of said reed which is free for sound producing vibrations; and a rigid cylindrical member configured with a spiraled groove portion therein, so that rotation of said rigid cylindrical member results in relative longitudinal movement with respect to said housing, which longitudinal movement simultaneously allows for some variability of said free end length and limits a range of variability of said free end length.

2. A game call apparatus according to claim 1 wherein the reed contact location comprises two locations.

3. A game call apparatus according to claim 1 wherein said housing has a top side and a bottom side and further comprising a bellows disposed at said top side.

4. A game call apparatus according to claim 3 wherein the bellows has a smooth continuous top portion.

5. A game call apparatus according to claim 3 wherein said housing has a top side and a bottom side wherein the rigid cylindrical member is centrally disposed at said bottom side.

6. A game call apparatus according to claim 5 wherein the housing further comprises a protuberance, at said bottom side; said protuberances being configured to receive therein a cylindrical member with a spiraled groove portion therein.

7. A game call apparatus according to claim 3 further comprising a retainer plate for cooperation with said bellows.

8. A game call apparatus, comprising:
a housing, having a top end and a bottom end;
a sounding board coupled to the housing, the sounding board defining, at least in part, a main air channel;
a reed coupled to the sounding board adjacent the main air channel to produce sounds when air passes through the main air channel;
a pressure point structure disposed in the housing, the pressure point stricture configured for engaging the reed at a reed contact location, the pressure point structure urging the reed toward the sounding board at the reed contact location, the pressure point structure being movable relative to the reed, as air is forced across the reed to change a free end length of said reed which is free for sound producing vibrations; and
a rigid cylindrical member configured with a spiraled groove portion therein, so that rotation of said rigid cylindrical member results in relative longitudinal movement with respect to said housing, which longitudinal movement simultaneously allows for some variability of said free end length and limits a range of variability of said free end length;
said housing further comprising a bellows disposed at the top end and configured so that compression of the bellows in a direction parallel with a direction from an upper central portion of the top end to a lower central portion of the bottom end causes air to flow through the main air channel and sound to be generated, further compression of the bellows is configured to cause a manipulation of the pressure point structure to cause the reed contact location to change, thereby changing the free end length of said reed.

9. A game call of claim 8 wherein the pressure point structure is configured to cause a non-continuous movement in the reed contact location when a generally continuous movement is imparted to the pressure point structure.

10. A game call of claim 8 wherein a generally continuous depression of the bellows results in discontinuous change in free end length of the reed.

11. A game call of claim 8 wherein a generally continuous downward depression of the bellows results first in no change in the free end length of the reed, and then a rapid change in the free end length of reed, where the rapid change of free end length occurs between two predetermined free end lengths associated with a pair of predetermined detents.

12. A game call of claim 8 wherein the main air channel is perpendicular to a direction of movement in a top portion of the pressure point structure.

13. A game call of claim 8 wherein the pressure point structure contacts the reed at only a central point on the reed.

14. A game call of claim 8 wherein a generally continuous downward force applied via the bellows to a top portion of the pressure point structure results in no change in free end length of the reed, but does result in flexing of the pressure point structure, which reduces the magnitude of force applied by the pressure point structure to the reed.

15. A game call apparatus comprising:
an object having a top end and a bottom end;
a sounding board coupled to the object, the sounding board defining, at least in part, a main air channel having a main air channel axis;
a reed coupled to the sounding board adjacent the main air channel to produce sounds when air passes through the main air channel along the main air channel axis;
a pressure point structure disposed within the object, the pressure point structure configured for engaging the reed at a reed contact locations the pressure point structure holding the reed against the sounding board at the reed contact location, the pressure point structure being movable relative to the reed, as air is forced across the reed to change a free end length of said reed which is free for sound producing vibrations; and
a rigid cylindrical member configured with a spiraled groove portion therein, so that rotation of said rigid cylindrical member results in relative longitudinal movement with respect to said housing, which longitudinal movement simultaneously allows for some variability of said free end length and limits a range of variability of said free end length;
said object comprising a bellows disposed at the top end and configured so that compression of the bellows in a compression direction which is parallel with a direction from an upper central portion of the top end to a lower central portion of the bottom end causes air to flow through the main air channel and sound to be generated, further compression of the bellows is configured to cause a manipulation of the pressure point structure to cause the reed contact location to change, thereby changing the free end length of said reed.

* * * * *

UNITED STATES PATENT AND TRADEMARK OFFICE
CERTIFICATE OF CORRECTION

PATENT NO. : 7,462,091 B1  Page 1 of 1
APPLICATION NO. : 10/709975
DATED : December 9, 2008
INVENTOR(S) : Ron M. Bean It is certified that error appears in the above-identified patent and that said Letters Patent is hereby corrected as shown below:

In Column 2, line 24, after the word "section", please insert --or housing--.

In Column 2, line 43, after the word "tube", please insert --or sounding board--.

Also in Column 2, line 44, after the word "passage", please insert --or main air channel--.

Further in Column 2, line 49, after the word "plunger", please insert --or pressure point structure--.

In Column 3, line 15, after the word "member", please insert --or retaining plate--.

In Column 4, line 18, please delete the word "pre-determined" and insert therefore --predetermined--.

In Claim 8, column 5, line 40, please delete the word "stricture" and replace it with --structure--.

In Claim 15, column 6, line 37, please delete the word "locations" and replace it with --location,--.

Signed and Sealed this

Sixteenth Day of February, 2010

David J. Kappos
*Director of the United States Patent and Trademark Office*